2,828,208

HYDROXY MERCAPTOPROPIONIC ACIDS AND DERIVATIVES THEREOF

Constantine E. Anagnostopoulos, Waltham, and Robert J. Wineman, Concord, Mass., assignors to Monsanto Chemical Company, St. Louis, Mo., a corporation of Delaware No Drawing. Application December 31, 1953
Serial No. 401,721

5 Claims. (Cl. 99—4)

The present invention relates to novel hydroxy propionic acids containing mercapto groups, and to derivatives of such acids, and methods of preparing such compounds. More particularly the invention relates to the preparation of alpha-hydroxy-beta-mercaptopropionic acid and derivatives thereof.

It is a primary object of the invention to provide hydroxy-mercaptopropionic acid compounds and derivatives which are highly useful as additives to poultry feed compositions to promote growth or to increase the effective utilization of feeds by poultry, and to provide processes for the preparation of such compounds and derivatives.

It is a further object of the invention to provide novel compositions suitable for use as poultry feeds, which compositions provide improved feeding efficiency and growth in poultry.

Still further objects and advantages of the invention will become apparent from the following description and appended claims.

The hydroxy mercaptopropionic acids of the present invention can be prepared in several ways, but are preferably prepared by reacting a hydroxy chloropropionic acid with a hydrosulfide. In general, the process of this invention can be carried out by mixing a solution of hydrosulfide with alpha-hydroxy-beta-chloropropionic acid, allowing the resulting solution to react for at least five minutes at a temperature between 15 and 120° C., and isolating the alpha-hydroxy-beta-mercaptopropionic acid which forms by any suitable method. By way of example, the process will be described in detail with respect to alpha-hydroxy-beta-mercaptopropionic acid and sodium hydrosulfide. However other alkali metal hydrosulfides such as potassium hydrosulfide can be used.

The process is carried out by adding an aqueous solution containing 5 to 50% of sodium hydrosulfide to an aqueous solution containing 5 to 50% of alpha-hydroxy-beta-chloropropionic acid which has previously been brought to a pH of about 7 by the addition of sodium carbonate or other alkali metal carbonate or hydroxide. Preferably 5 to 25% molar excess of sodium hydrosulfide is used. The addition of the hydrosulfide is carried out over a period of 15 minutes to one hour and at a temperature between 15 and 100° C., but preferably between 15 and 20° C. The mixture is then heated to a temperature between 50 and 120° C. for one to 3 hours, preferably at a temperature between 90 and 100° C. for about one hour. The mixture is then cooled to about 25° C. and neutralized by the slow addition of a mineral acid, such as, preferably, sulfuric acid. During the acidification a certain amount of hydrogen sulfide is evolved and a precipitate is often formed. The mixture is then filtered to remove any solid matter and the clear filtrate concentrated to a small volume, preferably ½ or less than ½ of the original volume. The resulting solution is then extracted with ether. The ether extract is then dried and the ether evaporated under vacuum, preferably at an absolute pressure of 20 to 25 mm. of Hg. The oily residue which remains soon solidifies to crystalline alpha-hydroxy-beta-mercaptopropionic acid. However crystallization does not always take place, as in some instances the oil residue remains as an oil.

Instead of neutralizing the hydroxy chloropropionic acid by adding sodium carbonate to the aqueous solution, the acid may be only partly neutralized, or this step may be omitted entirely. However the best yields are obtained when at least 80 to 90% of the acid is neutralized. Instead of sodium carbonate any other alkali metal or alkaline earth metal salt or base, such as sodium hydroxide or calcium hydroxide can be added in order to neutralize the acid partially or completely.

Instead of extracting the reaction product from its aqueous solution by means of ether, other water-immiscible solvents can be used, if desired, such as chloroform, carbon bisulfide or the like. The hydroxy mercaptopropionic acid can also be isolated by other methods, such as by passing the water solution of alpha-hydroxy-beta-mercaptopropionic acid through an ion-exchange resin, such as Dowex 50, to remove all metal cations, and then separating solutions containing the organic and inorganic acids, after which the water is completely removed from the organic acid by evaporation under reduced pressure.

As a further alternative the hydroxy mercaptopropionic acid can be precipitated from the aqueous solution in which it is prepared as the insoluble cuprous mercaptide by the addition of cuprous oxide. The acid can also be separated by adding an alkaline earth metal hydroxide or carbonate to the aqueous solution in which it is formed, after which it is precipitated as the alkaline earth metal salt by the addition of methyl or ethyl alcohol or by evaporation of the water to dryness. Suitable alkaline earth metal hydroxides or carbonates for this purpose include the hydroxides or carbonates of calcium, barium or magnesium.

Instead of adding the sodium hydrosulfide solution to the aqueous solution of the hydroxymercaptopropionic acid, as described above, the propionic acid solution can be added to the sodium hydrosulfide solution with equally good results. The procedure otherwise remains the same as hereinbefore described.

Having obtained the free alpha-hydroxy-beta-mercaptopropionic acid, it is relatively simple to make certain derivatives of the acid, including the ammonium salt, alkali metal salts, such as the sodium or potassium salt, and alkaline earth metal salts, such as the calcium barium or magnesium salt. All of these compounds and derivatives have been found useful in poultry feed compositions. In general, the invention includes compounds having the formula:

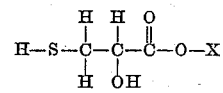

where X represents —H, —NH$_4$, -alkali metal, -alkaline earth metal-OH, or -alkaline earth metal

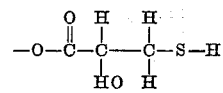

The derivatives included in the above formula are in general prepared by carefully neutralizing an aqueous solution of the alpha-hydroxy-beta-mercaptopropionic acid with the corresponding metal hydroxide or carbonate, or ammonium hydroxide or carbonate. Isolation of the salts thus obtained can be effected by evaporating the aqueous solution to dryness under reduced pressure and preferably under an inert atmosphere, such as for example, nitrogen.

The compounds of this invention which may be prepared as hereinbefore described are primarily useful as additives to poultry feed compositions. Thus, in general, it has been found that when small quantities of these compounds, e. g. from 0.005 to 1% by weight based on the feed or ration, are incorporated in the feed, they tend to promote the growth of the poultry and/or to improve the efficiency of feed utilization by the poultry. The amounts of feed additive employed are dependent on the particular poultry feed composition used. In general the preferred amounts range between 0.4 and 0.8% by weight, based on the weight of the entire feed composition.

A further understanding of the compounds of this invention and their preparation and use in feed compositions will be obtained from the following examples, in which the parts and percentages given are by weight unless otherwise specified.

EXAMPLE I

*Preparation of alpha-hydroxy-beta-mercaptopropionic acid*

A well-stirred solution of about 62 grams (0.5 mol) of alhpa-hydroxy-beta-chloropropionic acid in 500 ml. of water was partially neutralized by the addition of 30 grams of sodium carbonate (anhydrous). To the resulting solution was then added dropwise about 120 ml. of a 35% aqueous solution of sodium hydrosulfide (sodium sulfhydrate liquid) over a period of one hour. The temperature of the reaction mixture was kept between 16 and 19° C. until the addition was over and then heated to about 100° C. for one hour. After cooling to about 15° C. the solution was brought to a pH of about 3 by the addition of a 70% aqueous sulfuric acid. The resultant light yellow solution was then concentrated to a volume of about 400 ml. by heating to about 50° C. and at an absolute pressure of 20 mm. of Hg, cooled and extracted continuously for about 10 hours with diethyl ether. After this period, the ether extract was dried over anhydrous sodium sulfate and the ether evaporated under an absolute pressure of 18 mm. of Hg. A thick oily residue remained which upon cooling yielded crystalline alpha - hydroxy - beta - mercaptopropionic acid, melting point 59 to 63° C. This acid was found to be soluble in water, ethanol, acetone, ethyl acetate and to a lesser degree in chloroform and benzene, while insoluble in petroleum ether.

Calculated on the basis of the formula $C_3H_6O_2S$: $C=29.50\%$, $H=4.95\%$ and $S=26.25\%$. Found by analysis: $C=29.5\%$, $H=5.1\%$ and $S=26.5\%$.

The infra-red spectrum of the acid taken in mineral oil showed hydroxyl group (3.0 microns), sulfhydryl group (3.95 microns) and acid carbonyl (5.9 microns).

Iodate titration indicated a molecular weight, based on sulfhydryl group, of 122. Neutralization equivalent with sodium hydroxide gave a value of 124. The calculated value for $C_3H_6O_3S$ is 123.14.

EXAMPLE II

*Preparation of alpha-hydroxy-beta-mercaptopropionic acid*

To a solution of 62.0 grams (about 0.5 mol) of alpha-hydroxy-beta-chloropropionic acid in 500 ml. of water were added in small portions and with stirring 39 grams of sodium carbonate (anhydrous). To this mixture was then added 132 ml. of a 35% aqueous solution of sodium hydrosulfide over a period of 15 minutes and at a reaction-mixture-temperature of 90 to 95° C. Where the addition was over the reaction mixture was kept at the above temperature for an additional hour, then cooled to about 15° C. and 130 ml. of concentrated hydrochloric acid added. Considerable hydrogen sulfide was evolved and a precipitate formed. The mixture was filtered to remove the solids present and concentrated under an absolute pressure of 18 mm. of Hg to a volume of 450 ml. It was then extracted continuously for 18 hours with diethyl ether. The ether extract was separated, dried over anhydrous sodium sulfate and the ether evaporated under an absolute pressure of about 20 mm. of Hg. The remaining residue was found to be identical with the alpha-hydroxy-beta-mercaptopropionic acid contained in Example I.

EXAMPLE III

*Preparation of calcium alpha-hydroxy-beta-mercaptopropionate*

To a solution of 12.3 grams (0.1 mol) of alpha-hydroxy-beta-mercaptopropionic acid in 50 ml. of absolute ethanol were added 6 grams of calcium hydroxide and the mixture stirred and heated on the steam bath for about 10 minutes. Any excess calcium hydroxide was then filtered off and the clear alcoholic filtrate cooled to room temperature. Addition of ethyl ether caused a white precipitate to appear which was found to be calcium alpha-hydroxy-beta-mercaptopropionic acid.

Calculated on the basis of $(C_3H_5O_3S)_2Ca$ (molecular weight 284.36): $Ca=14.09\%$. Found by analysis, 14.2%.

The infra-red spectrum taken in mineral oil indicates hydroxy group (3.0 microns), sulfhydryl group (3.98 microns, very weak) and acid salt carbonyl (6.2 microns, broad).

EXAMPLE IV

*Preparation of sodium alpha-hydroxy-beta-mercaptopropionate*

A solution of 6.1 grams (0.05 mol) of alpha-hydroxy-beta-mercaptopropionic acid in 25 ml. of water was brought to a pH of 7 by the careful addition of a 25% aqueous sodium hydroxide solution. Evaporation to dryness at an absolute pressure of about 12 mm. of Hg and under an inert atmosphere of nitrogen left a solid residue which upon washing with diethyl ether and drying was found to be sodium alpha-hydroxy-beta-mercaptopropionate. Calculated on the basis of $C_3H_5O_3SNa$ (molecular weight 146,14): $Na=15.73\%$. Found by analysis, 16.0%. The infra-red spectrum taken in mineral oil indicates hydroxy group (3.0 microns), sulfhydryl group (3.95 microns, very weak) and acid salt carbonyl (6.2 microns, broad).

EXAMPLE V

The alpha-hydroxy-beta-mercaptopropionic acid, prepared as described in Example I, was added to a basal poultry diet for the purpose of promoting the growth of chicks and tested according to the following procedure and with the following results:

The chicks at hatching were placed in an electrically-heated metal battery brooder equipped with raised wire screen floors. They were fed a chicken starter ration, which was known to be deficient in sulfur amino acids, until they were three weeks old. At this time, they weighed on the average about 70 grams each. The chicks were then separated into two groups of six, one of which was fed the same basic diet, deficient in sulfur amino acids, over a period of 4 days, while the second group was fed for an equal period the same diet, to which 0.4% by weight of alpha-hydroxy-beta-mercaptopropionic acid, based on the weight of the entire feed composition had been added.

The basic diet contained about 23% protein, and had the following percentage composition:

| | Percent |
|---|---|
| Vitamin mix [1] | 0.71 |
| Choline chloride (25%) | 1.41 |
| Casein | 21.37 |
| Gelatin | 14.25 |
| Minerals and salts | 6.00 |
| Corn oil | 5.70 |

Enough glucose to make 100%.

[1] The vitamin mix used contained more than the minimum allowance of water-soluble and fat-soluble vitamins as recommended by the National Research Council.

On weighing the birds at the end of the four-day test period, it was found that the average weight increase per bird was 15 grams in the case of the birds fed the deficient basic diet, while the average weight increase of the birds fed the supplement diet was 22 grams.

What is claimed is:

1. A poultry feed composition comprising a poultry feed and a compound having the general formula:

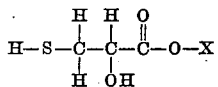

where X is selected from the group consisting of —H, —NH$_4$, -alkali metal, -alkaline earth metal-OH and -alkaline earth metal

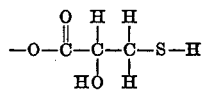

2. A poultry feed composition comprising from about 0.005 to 1% by weight, based on the composition, of alpha-hydroxy-beta-mercaptopropionic acid.

3. A poultry feed composition comprising from about 0.005 to 1% by weight, based on the composition, of the sodium salt of alpha-hydroxy-beta-mercaptopropionic acid.

4. A poultry feed composition comprising from about 0.005 to 1% by weight, based on the composition, of the ammonium salt of alpha-hydroxy-beta-mercaptopropionic acid.

5. A poultry feed composition comprising from about 0.005 to 1% by weight, based on the composition, of the calcium salt of alpha-hydroxy-beta-mercaptopropionic acid.

References Cited in the file of this patent

UNITED STATES PATENTS

| | | |
|---|---|---|
| 2,727,065 | Anagnostopoulos | Dec. 13, 1953 |
| 2,745,745 | Blake | May 15, 1956 |

OTHER REFERENCES

Koelsch: J. A. C. S., vol. 52, pp. 1105–8, 1930.

Richter: Organic Chemistry, vol. I, 3rd Eng. edition, page 429.